(12) United States Patent
Lanser et al.

(10) Patent No.: US 6,544,022 B2
(45) Date of Patent: *Apr. 8, 2003

(54) HEAT STAKING HEAD WITH RADIANT HEAT SOURCE

(75) Inventors: Mark W. Lanser, Cadillac; Roger Miller, Holland; Andrew Van Klompenberg, Grandville, all of MI (US)

(73) Assignee: Extol. Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/866,997

(22) Filed: May 7, 2001

(65) Prior Publication Data

US 2002/0001639 A1 Jan. 3, 2002

Related U.S. Application Data

(63) Continuation-in-part of application No. 09/531,543, filed on Mar. 20, 2000, now Pat. No. 6,296,470.

(51) Int. Cl.[7] .......................... B29C 65/14; B29C 65/64
(52) U.S. Cl. .......................... 425/3; 264/249; 264/481; 425/112; 425/174.4; 425/392; 425/508; 425/DIG. 33
(58) Field of Search .................. 425/3, 508, 509, 425/112, 174.4, 392, DIG. 33; 264/249, 481; 29/243.5, 509

(56) References Cited

U.S. PATENT DOCUMENTS

| | | | | | |
|---|---|---|---|---|---|
| 3,452,376 | A | * | 7/1969 | Ito | 425/174.4 |
| 4,510,005 | A | * | 4/1985 | Nijman | 425/392 |
| 4,767,298 | A | * | 8/1988 | Bocchicchio et al. | 264/249 |
| 5,018,957 | A | * | 5/1991 | Assink et al. | 425/112 |
| 5,227,173 | A | * | 7/1993 | Sherwood | 29/243.5 |
| 6,099,291 | A | * | 8/2000 | Lanser | 425/508 |
| 6,296,470 | B1 | * | 10/2001 | Lanser et al. | 264/249 |
| 6,298,533 | B1 | * | 10/2001 | Nishimura et al. | 29/243.5 |

* cited by examiner

*Primary Examiner*—Robert Davis
(74) *Attorney, Agent, or Firm*—Young & Basile (57) ABSTRACT

An apparatus for heat staking utilizes an infrared lamp to direct radiant energy onto a plastic part to heat and so soften it prior to the staking punch impacting the part. The apparatus comprises an energy directing means for concentrating the infrared energy onto the part, and a moveable carriage for moving the punch toward and away from the part. One embodiment of the energy concentrating means is a reflector, wherein the reflector includes a central aperture for admission of the part, and wherein the reflector comprises different curved sections for concentrating the energy over the surface of the part. In an alternate embodiment, the energy directing means comprises fiber optic cables for directing the infrared energy to the surface of the part.

22 Claims, 8 Drawing Sheets

HEAT STAKING HEAD WITH RADIANT HEAT SOURCE

CROSS-REFERENCE TO RELATED APPLICATIONS

This application is a continuation-in-part of U.S. application Ser. No. 09/531,543, filed Mar. 20, 2000 and now U.S. Pat. No. 6,296,470.

BACKGROUND OF THE INVENTION

The present invention relates to heat staking machines for joining parts together, and more particularly to a device for use on such a machine and having a radiant heat source to heat and thereby soften the part to be deformed.

Heat staking is a process for permanently joining first and second parts at one or more discrete points marked by a plastic protrusion, hereinafter referred to as a stud, which extends upwardly from the first part and through an aperture in the second part when the second part is placed over the first part. The stud is sufficiently long to provide a volume of thermoplastic material which extends beyond the upper surface of the second part. Therefore, the plastic stud is heated until it is plastically deformable and then flattened and flared out with a metal punch to form a rivet-like head which locks the two parts together.

It is possible to accomplish the heating and the deforming of the stud simultaneously by heating the punch prior to bringing it into contact with the stud, the punch transferring its heat to the stud to soften it as it is being shaped. In such an operation, the punch is typically resistance heated by electrical current. Heat staking machines operating in this manner are disclosed in U.S. Pat. Nos. 4,767,298 and 5,227,173.

Another known heat staking technique is to heat the stud prior to it being contacted by the punch. In the past, this has been achieved by blowing hot air over the stud. U.S. Pat. No. 5,018,957 discloses a staking machine using electric heaters to generate the hot air and blowers to circulate the hot air over the stud. In some manufacturing operations, this pre-impact heating of the stud has been found to be advantageous in that it minimizes the amount of residual stress in the deformed stud after it has cooled. In the past, however, the apparatus necessary for the heating and circulation of air has resulted in a relatively large and mechanically complicated machine. Also, such a machine is relatively energy inefficient in that a large percentage of the heat generated is not transferred to the stud but rather is wasted. Moreover, the heat may be damaging to elements, such as printed circuits, on the parts being joined.

It is therefore desirable to provide a heat staking machine that is energy efficient and that is simple and compact in construction, and which overcomes the problems associated with prior devices.

SUMMARY OF THE INVENTION

The present invention addresses and solves the above-mentioned problems and meets the enumerated objects and advantages, as well as others not enumerated, by providing an apparatus for heat staking in which the stud is heated by precisely focused infrared energy. The apparatus comprises a housing for holding the apparatus and for defining a cavity which can be placed in such a position as to substantially surround the stud. An infrared energy source is affixed to the housing with an energy directing means for directing the energy to the stud for the purpose of softening the stud. A deforming tool, hereinafter referred to as a punch, is mounted on a moveable carriage and designed for movement relative to the energy source toward and away from the stud.

A preferred embodiment of the present invention hereinafter described utilizes at least one broadband incandescent lamp as the infrared energy source. This lamp is preferably a halogen lamp. The energy directing function is performed by one or more reflectors which are preferably gold plated to provide preferentially high reflectivity of infrared, thus increasing the percentage of total energy produced which reaches the stud.

In a specific embodiment comprising primary and secondary reflectors, the secondary reflector is segmented to direct infrared energy to different areas of the stud, thus distributing the infrared energy over a larger area of the stud and reducing the time required to produce the softened state.

In an alternate embodiment, the energy directing means includes a lens for focusing the energy into fiber optic cables. The fiber optic cables are arrayed around the stud, whereby the energy is directed from the cables onto the stud.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
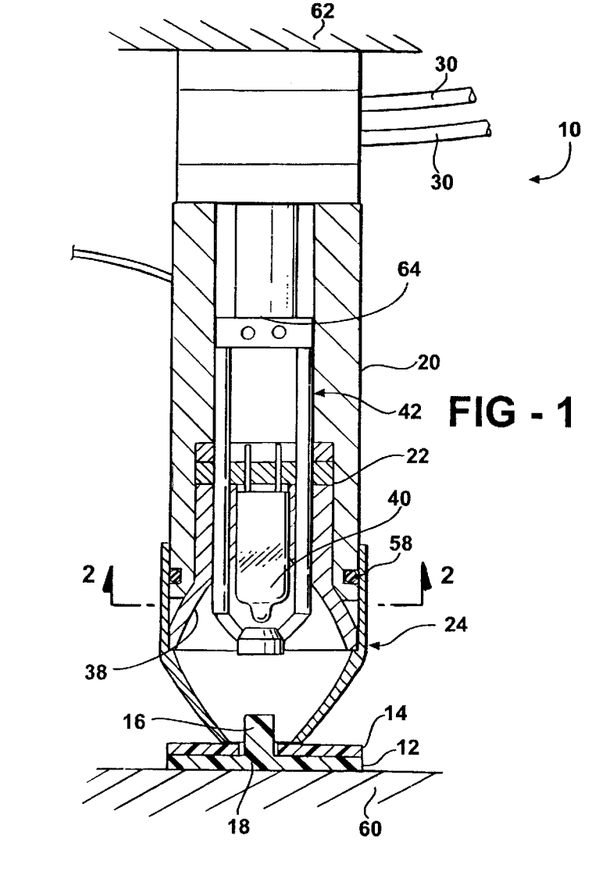
FIG. 1 is a side elevation view of a staking device according to a first embodiment of the invention with a staking punch in a retracted position.
Figure 2:
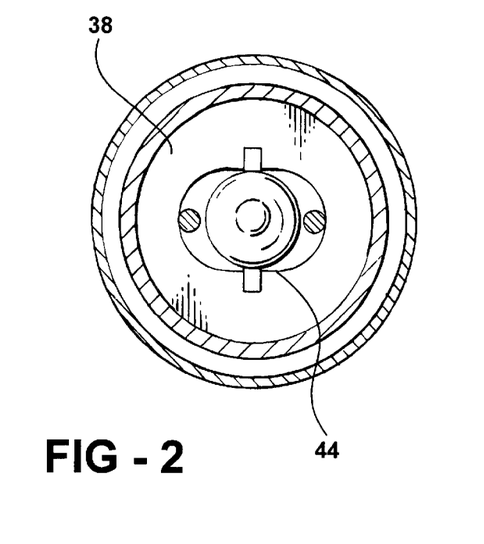
FIG. 2 is a cross-sectional view taken along line 2—2 of FIG. 1.
Figure 3:
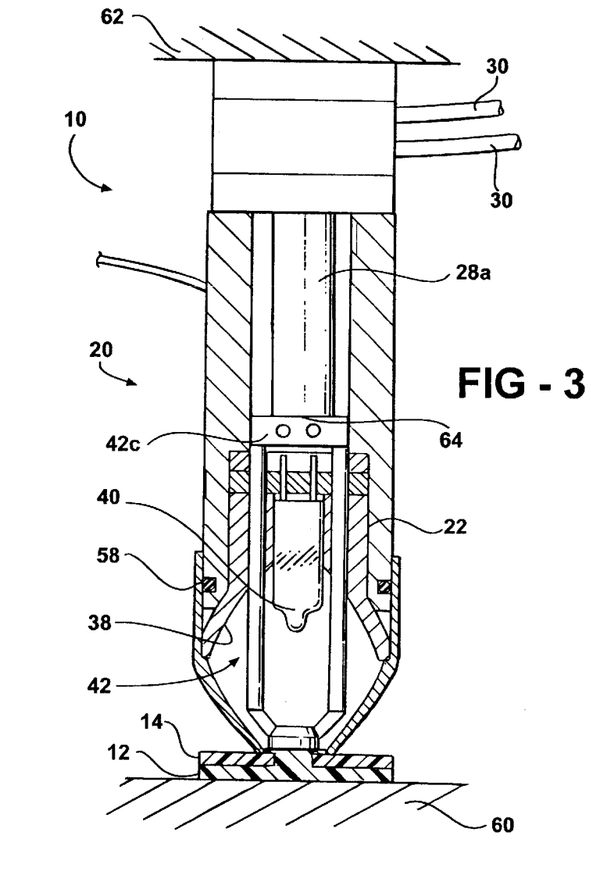
FIG. 3 is a side-elevation of the heat staking device of FIG. 1 with the staking punch in the extended position to contact a workpiece.

Referring now to FIGS. 1–3, a heat staking device 10 according to the present invention is shown positioned above first and second workpieces 12,14 which are to be joined. As is well known in the heat staking art, a boss or stud 16 formed of a thermoplastic material such as ABS plastic projects upwardly from the first workpiece 12, passes through a hole 18 formed in the second workpiece 14 and extends above the second workpiece 14 to provide a volume of deformable plastic material. The stud 16 is deformed into a fastener head utilizing heat staking device 10 in the manner to be described below to secure the first and second workpieces 12, 14 together.

The heat staking device 10 comprises a hollow cylindrical body 20, an assembly 22 having a cylindrical portion which is received within the hollow interior of the body 20 and a parabolic portion which surrounds an incandescent lamp 40 and defines a primary parabolic reflector 38. An end cap 24 attaches to the body 20 and defines a secondary reflector to receive radiation from the primary reflector 22 and directs it to the strut 16 where it is located within the end cap 24. In essence, the primary reflector 38 captures radiation emitted radially from lamp 40 and directs it axially toward the end cap 24. The secondary reflector defined by the end cap redirects the radiation radially inwardly toward a stud 16 protruding through the aperture in the end of cap 24 to heat and soften it.

Figure 4A:
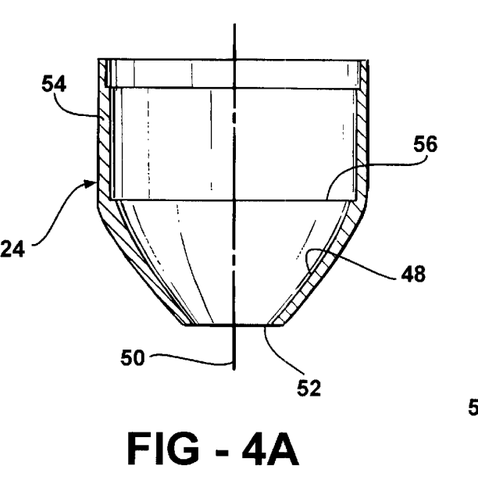
FIG. 4a is a side elevation view of a secondary reflector in the heat staking device of FIGS. 1–3.

As shown in FIGS. 2 and 4a, the body 20 and end cap 24 are circular in cross section. The lower end of end cap 24 has a polished interior surface 48 with an axis of symmetry 50 oriented vertically as shown in FIG. 4a. A central aperture 52 is formed at the vertex of the cap 24 and is sized to allow stud 16 to protrude upwardly therethrough as seen in FIG. 1. A cylindrical rim 54 extends upwardly from secondary reflector 48 and has an annular shoulder 56 immediately adjacent the upper edge of secondary reflector 48.

Figure 5:
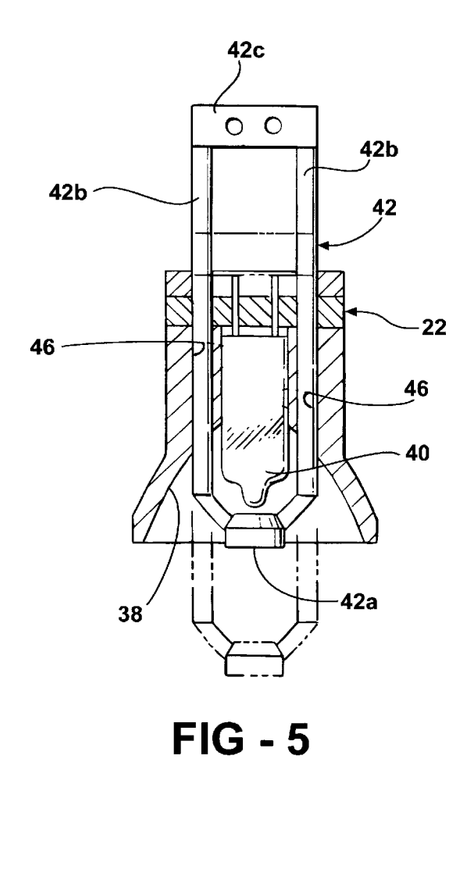
FIG. 5 is a view of the primary reflector/punch assembly of the heat staking device of FIGS. 1–3.

As seen in FIGS. 1, 2 and 5, the assembly 22 further comprises a punch 42a having legs 42b straddling the lamp 40 and connected to a carriage 42 for vertical sliding movement relative to the lamp 40 and the primary reflector 38. As shown in FIG. 5, the carriage 42 moves between the retracted position, shown in solid lines, and the extended position shown in phantom lines. The punch head 42 is shaped in this case like an inverted cup to define the desired shape of the stud 16 after deformation. The punch head 42a and legs 42b are typically cast from a suitable metal and the contact surface may be cast, engraved or embossed to impart any desired design or logo to the finished plastic fastener formed from stud 16. Punch legs 42b are connected at the top by plate 42c.

The incandescent lamp 40 is preferably a 100 watt halogen lamp which produces substantial radiant energy in the infrared band, and is hereinafter referred to as an infrared lamp 40. The adjustable carriage 42 is selectively driven toward and away from the stud 16 by a drive piston 28a of an air cylinder 28. The infrared lamp 40 projects through a round opening 44 at the vertex of primary reflector 38 (see FIG. 2).

Figure 6:
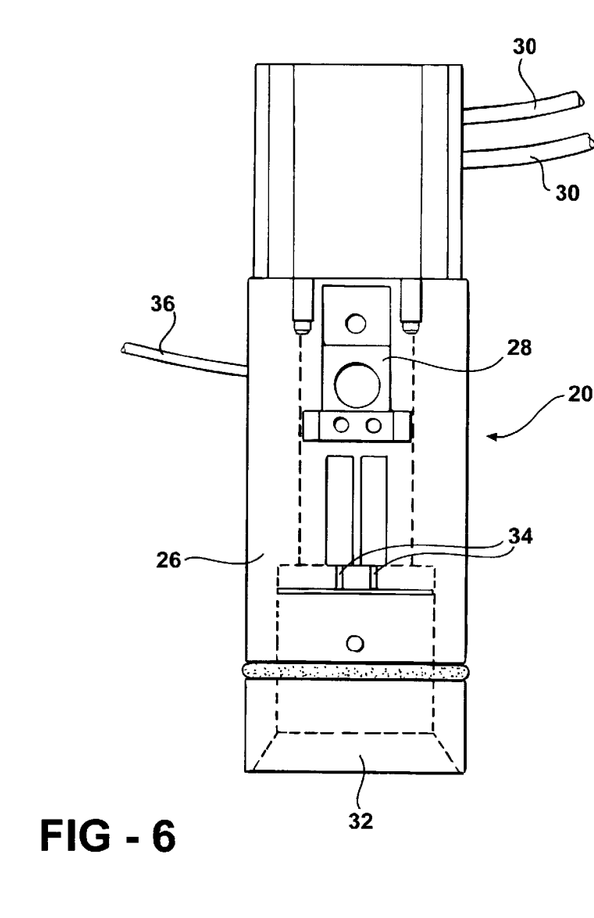
FIG. 6 is a view of the body assembly portion of the heat staking device of FIGS. 1–3.

The body portion 20 which holds the reflector/punch assembly 22 and the end cap is shown in FIG. 6. The body portion 20 comprises a generally cylindrical housing 26, an air cylinder 28 mounted to an upper end of the housing and is supplied with air pressure through hoses 30, a hollow receptacle 32 at a lower end of the housing, and electrical connectors 34 at an upper end of the receptacle 32. Electrical power is supplied to connectors 34 through a power cord 36.

Figure 4B:
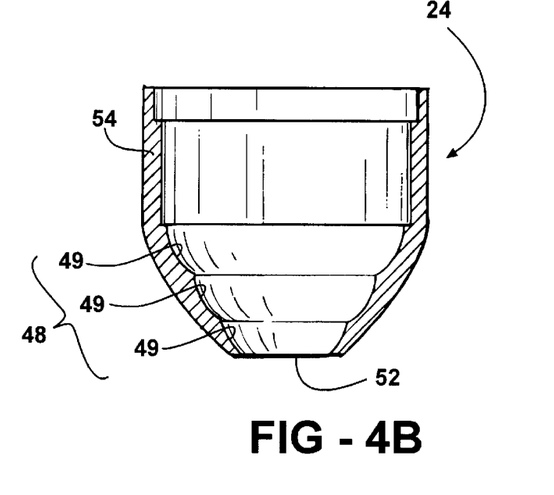
FIG. 4b is a side elevation view of a secondary reflector in the heat staking device of FIGS. 1–3 with a plurality of curved sections for directing the energy onto a stud.

In an alternative embodiment, the secondary reflector 48 comprises a plurality of connected curved sections 49 with a central aperture 52, as shown in FIG. 4b. The secondary reflector 48 concentrates the light directed from a primary reflector 38 onto the stud 16. The plurality of curved sections distributes the concentrated light over the portion of the stud 16 inserted into the cavity through the aperture 52, rather than concentrating the light on a single smaller area of the stud 16. This provides for a more rapid and more even distribution of energy to the portion of the stud 16 inserted into the cavity, and therefore a more rapid softening of the stud 16. In another alternative, the secondary reflector 48 may comprise a single nonparabolic curved section for distributing the concentrated light over the portion of the stud 16 inserted into the cavity.

To assemble the heat staking device 10 from the three components shown in FIGS. 4–6, the primary reflector/punch assembly 22 is inserted upwardly into receptacle 32 in the bottom of the body portion 20 so that the infrared lamp 40 makes contact with electrical connectors 34 and carriage butt plate 42c contacts a drive piston 28a of air cylinder 28. Air cylinder piston 28a preferably has a magnet 64 at its lower end which magnetically engages the butt plate 42c of the carriage 42 so that when the piston 28a returns to the retracted position it carries the carriage 42 along with it. This magnetic connection provides for superior field servicing of the heat staking device 10, as there is no mechanical connection which must be disconnected before disassembling the heat staking device 10. Although the magnetic connection is preferred, any means to create a detachable mechanical connection is contemplated to be within the scope of this invention. Alternatively, a spring (not shown) may be provided to return the punch 42 to the retracted position when air cylinder piston 28a is withdrawn. The end cap 24 is then fitted over the lower end of the body portion 20 such that the outer rim of the primary reflector 38 is seated on shoulder 56. The end cap 24 and body portion 20 may be secured together by a friction fit with a detent at the fully seated position, or rim 54 of the end cap 24 may have female threads formed on its inner circumference which mate with male threads formed on the lower end of the body portion 20. An O-ring 58 may be provided around the body portion 20 to achieve a moisture-tight seal with the end cap 24.

As seen in FIG. 1, the workpieces 12,14 are supported on top of a lower platen 60 of a staking machine, and the heat staking device 10 is attached to an upper platen 62 of the staking machine. Upper and lower platens 60,62 are vertically movable relative to one another so that the heat staking device 10 is movable between a lowered position wherein stud 16 projects through aperture 52 in the end cap 24 (as shown in FIGS. 1 and 3) and a raised position (not shown) wherein the stud is withdrawn from the aperture 52.

In operation, a staking cycle begins when the workpieces 12, 14 are positioned directly below the heat staking device 10 and the device is moved to a lowered position shown in FIG. 1. The lamp 40 is energized and the radiation emitted thereby is directed downwardly by the primary reflector 38, collected by the concave inner surface of the secondary reflector 48, and focused radially inward onto the stud 16. The lamp 40 is energized for a length of time sufficient to heat the stud 16 to a temperature at which it is plastically deformable. The required heating time depends upon the power output of the lamp 40 and the type and color of the plastic being heated. Using a 35 watt lamp 40 and white ABS plastic, for example, it has been found that it takes approximately 15 seconds to heat the stud 16 to 350–400° F., the temperature at which it may easily be formed. Darker colored plastic will heat up more quickly. In a preferred embodiment, the energy source is a 100 watt halogen lamp.

The halogen lamp 40 produces energy across a broad band including the infrared, and heats the plastic to the desired temperature rapidly.

Once the stud 16 is sufficiently softened, the lamp 40 is de-energized and the air cylinder 28 is actuated so that the drive piston 28a is extended to drive the carriage 42 downwardly, urging the punch 42a into contact with the stud 16 and deforming the stud as shown in FIG. 3. The stud 16 is deformed into a fastener head to secure the first and second workpieces together. Punch 42a preferably has a highly reflective surface finish so that it remains relatively cool. Accordingly, contact between the punch 42a and the stud 16 causes the stud 16 to quickly cool and resolidify so that it retains its deformed shape when the air cylinder drive piston 28a is retracted and the carriage 42 and punch 42a return to their raised position.

Rather than completely de-energizing the lamp 40 prior to actuation of the air cylinder 28, it may be advantageous instead to reduce the electrical voltage supplied to the lamp 40 to a low level. This keeps the lamp 40 filament somewhat warm between heating cycles so that the lamp 40 can quickly return to the desired operating temperature when full power is reapplied.

It should be noted that lamp 40, primary reflector 38, and secondary reflector 48 are oriented so that nearly all of the output of the lamp 40 is collected by the secondary reflector 48 and is concentrated onto the stud 16. Accordingly, there is very little undesirable and wasteful heating of the structure of the heat staking device 10 or the surface of the first workpiece 12 surrounding the stud 16.

The concave inner surfaces of the primary reflector 38 and secondary reflector 48 are highly reflective of the wavelengths of infrared radiation emitted by lamp 40. It has been found that a polished aluminum or stainless steel surface has desirable reflective properties. The secondary reflector 48 may be machined from a billet of aluminum or stainless steel, with the complex shape of the concave inner surface being formed by a computer numerically controlled milling machine. Preferably, a layer of gold is deposited on the surfaces of the primary reflector 38 and the secondary reflector 48. The gold is deposited by dip-plating, electroplating, or by any means that deposits a thin layer of gold on the reflectors 38, 48 surfaces. Preferably, the gold is deposited only on the surfaces of the reflectors 38, 48, but in an alternative, as an example, the entire end cap 24 may be dipped. Considerations for choosing the method of coating the reflectors 38, 48 include balancing the cost of the method of coating the reflectors 38, 48 with gold against the amount of gold used in the process of coating. Gold has the desirable property of reflecting virtually all of the energy in the infrared band thereby providing a very high efficiency for the transfer of infrared energy from the lamp 40 to the stud 16.

After punch 42 is returned to the retracted position, workpieces 12,14 are lowered relative to the staking device 10 (this may be achieved by raising upper platen or by lowering lower platen) to withdraw stud 16 from central aperture 52, and another pair of workpieces to be joined are placed in the position shown in FIG. 1. The heat/punch staking cycle is then repeated. Although FIGS. 1–3 depict a single staking device 10, it is well known in the art to construct heat staking machines having a plurality of staking devices which are driven simultaneously, sometimes by a single air cylinder, so that multiple heat staked joints may be formed with a single stroke of the machine.

In an alternative, rather than using a true parabolic primary reflector which is designed to direct its rays parallel to its central axis, it is possible to use a primary reflector having a convergent design. This type of reflector directs its rays inwardly toward a focal point, and this allows the secondary reflector 48 to be of smaller outer diameter than the primary reflector while still capturing all of the output of lamp 40.

Figure 7:
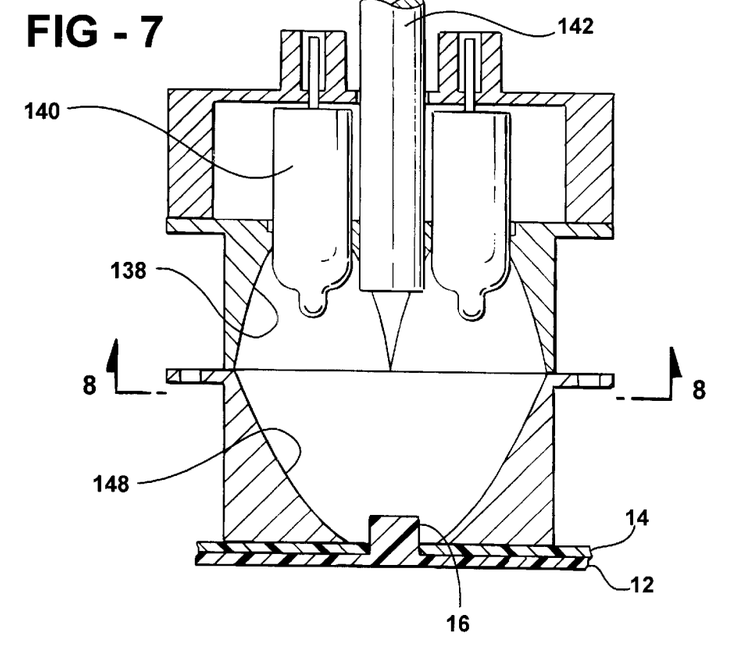
FIG. 7 is a partial side view of a second embodiment of a heat staking device according to the present invention.
Figure 8:
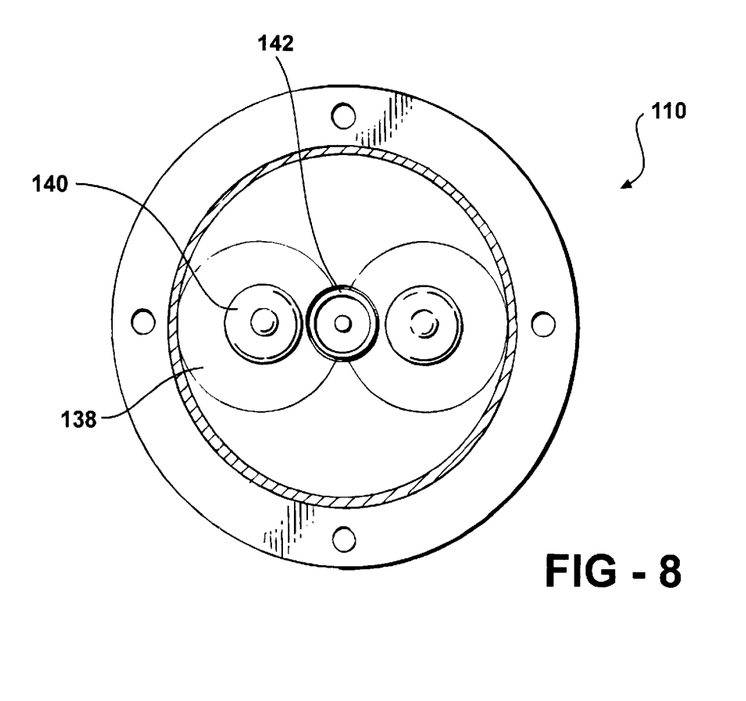
FIG. 8 is a cross-section view taken along line 8—8 of FIG. 7.

In another embodiment of the invention shown in FIGS. 7 and 8, a heat staking device 110 comprises two primary reflectors 138 and two lamps 140 disposed in a side-by-side relationship above a secondary reflector 148 generally similar to that described in relation to the embodiment of FIGS. 1–6. The adjustable carriage 142 is disposed between the two primary reflector/lamp combinations and is movable along the central axis of the secondary reflector 148 during the staking stroke. The adjustable carriage 142 is a cylindrical shaft, rather than having two legs for straddling the centrally located lamp 40 in the embodiment shown in FIGS. 1–6.

This multiple primary reflector configuration may be desirable in order to construct a staking press to meet certain space constraints, or where higher heat requirements require the use of two or more lamps. The interior surface of secondary reflector 148 may be specially designed to collect and focus the radiant energy from radiant heat sources located away from the main vertical axis of the secondary reflector. Any number of primary reflector/lamp assemblies may be disposed about the axis of adjustable carriage 142, space permitting. When multiple lamps are used, and disposed around the axis of the adjustable carriage 142, the lamps may include the primary reflector in the lamp unit. The use of a commercially available lamp and reflector unit provides for an energy source properly positioned within the reflector. This also provides for the convenient replacement of halogen lamps and reflectors.

Figure 9:
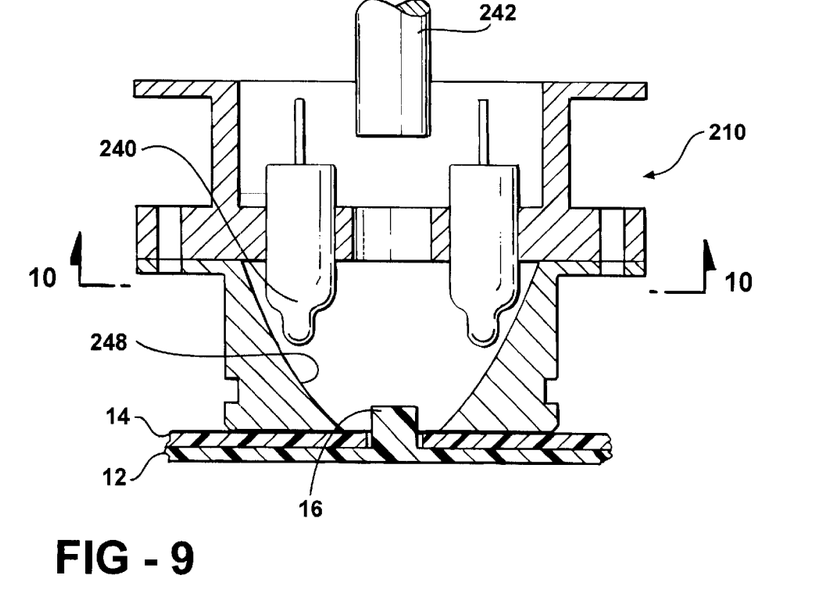
FIG. 9 is a partial side view of a heat staking device according to another embodiment of the invention.
Figure 10:
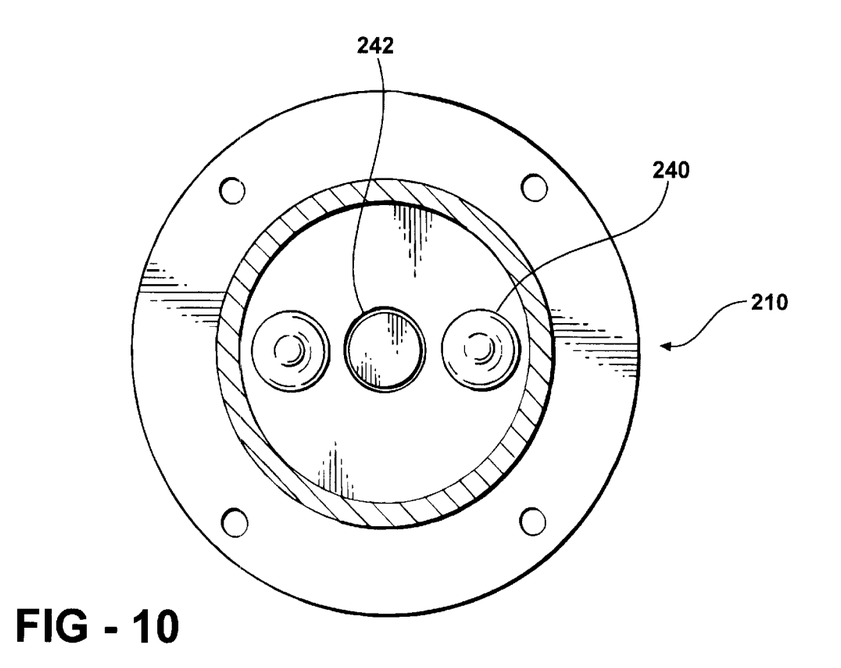
FIG. 10 is a bottom view of the heat staking device of FIG. 9.

In another embodiment of the invention shown in FIGS. 9 and 10, a heat staking device 210 has first and second lamps 240 disposed in a side-by-side relationship within the concave interior of single reflector 248. Reflector 248 has a central aperture 252 for receiving stud 16, just as in the previously described embodiments, and a significant portion of the output from lamps 240 is captured and focused onto the stud by the single reflector without the need for primary reflectors to initially direct their output downwardly. As in the embodiment of FIGS. 7 and 8, adjustable carriage 242 passes between the lamps 240 during the staking stroke. Any number of lamps 240 may be used in this embodiment and spaced around the central axis of reflector 248 and adjustable carriage 242.

Figure 11:
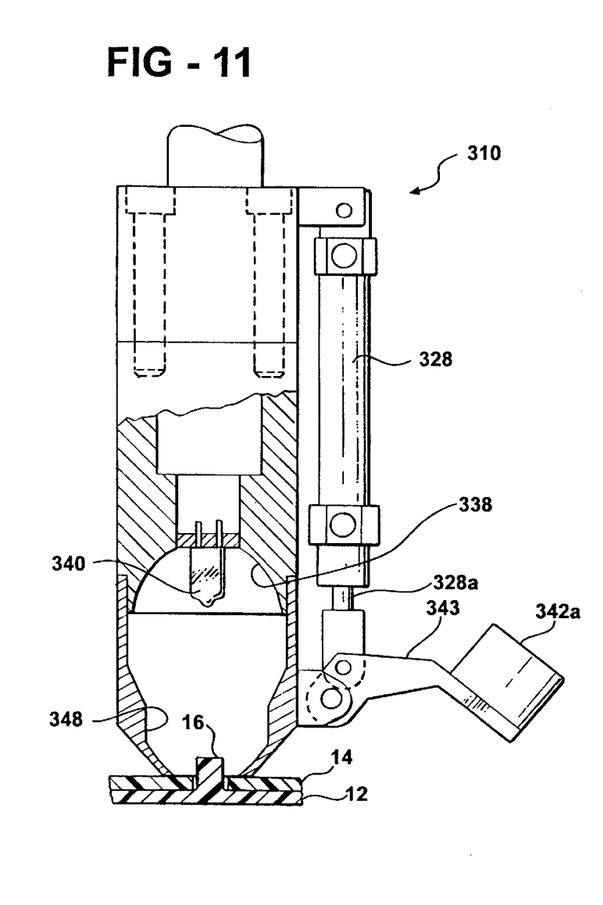
FIG. 11 is a side view of another embodiment of the present invention during the stud heating cycle.
Figure 12:
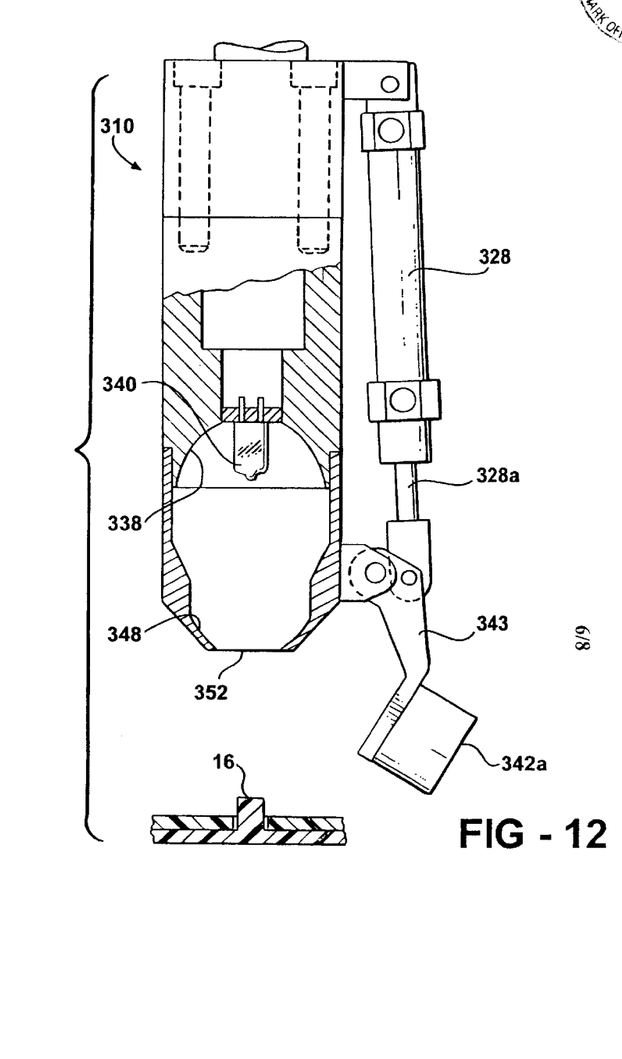
FIG. 12 is a side view of the heat staking device of FIG. 11 in a raised position.
Figure 13:
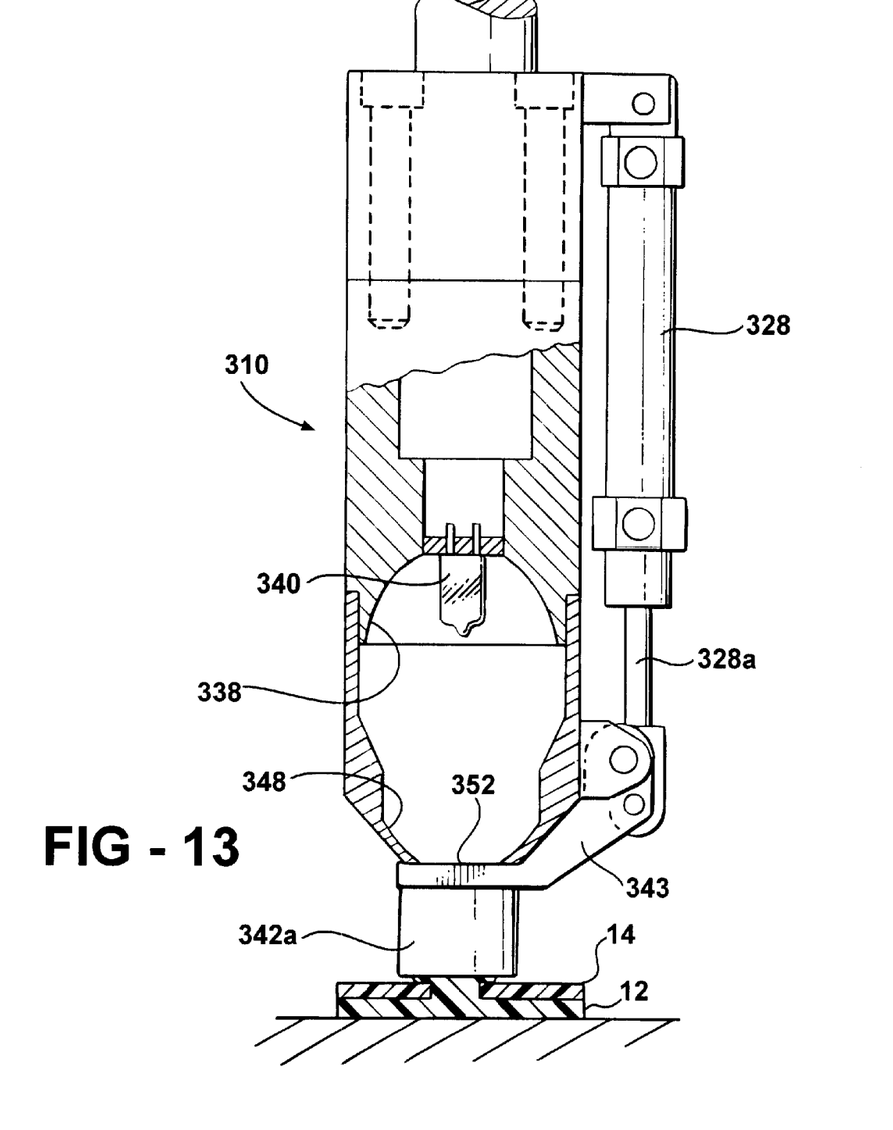
FIG. 13 is a side view of the heat staking apparatus of FIGS. 11–12 during the staking stroke.

In another embodiment of the invention depicted in FIGS. 11–13, a heat staking device 310 has a primary reflector 338, a radiant energy source 340 disposed within the primary reflector, and a secondary reflector 348 disposed below the primary reflector 338 to collect and focus energy from the source onto a stud 16. A punch 342a is disposed on an arm 343 pivotingly mounted on the outside of the reflector assembly. An air cylinder 328 is connected to the reflector assembly and has a vertically oriented drive piston 328a which is connected to the arm 343. During the heating cycle of the staking operation, staking device 310 is in a lowered position relative to the workpieces 12,14 and air cylinder drive piston 328a is retracted to rotate arm 343 and punch 342a to a raised position wherein it is pivoted outwardly and upwardly as shown in FIG. 11. After the stud 16 has been heated for a sufficient length of the time to soften it, the entire heat staking device 310 is raised upwardly with respect to the workpieces as shown in FIG. 12. The air cylinder piston 328a is then extended to rotate the arm 343 in a downward direction until punch 342a is located directly below the secondary reflector 348, blocking its central aperture 352 as shown in FIG. 13. The heat staking device 310 is then moved downwardly to urge punch 342*a* against the stud 16 and deform it, as shown in FIG. 13.

Figure 14:
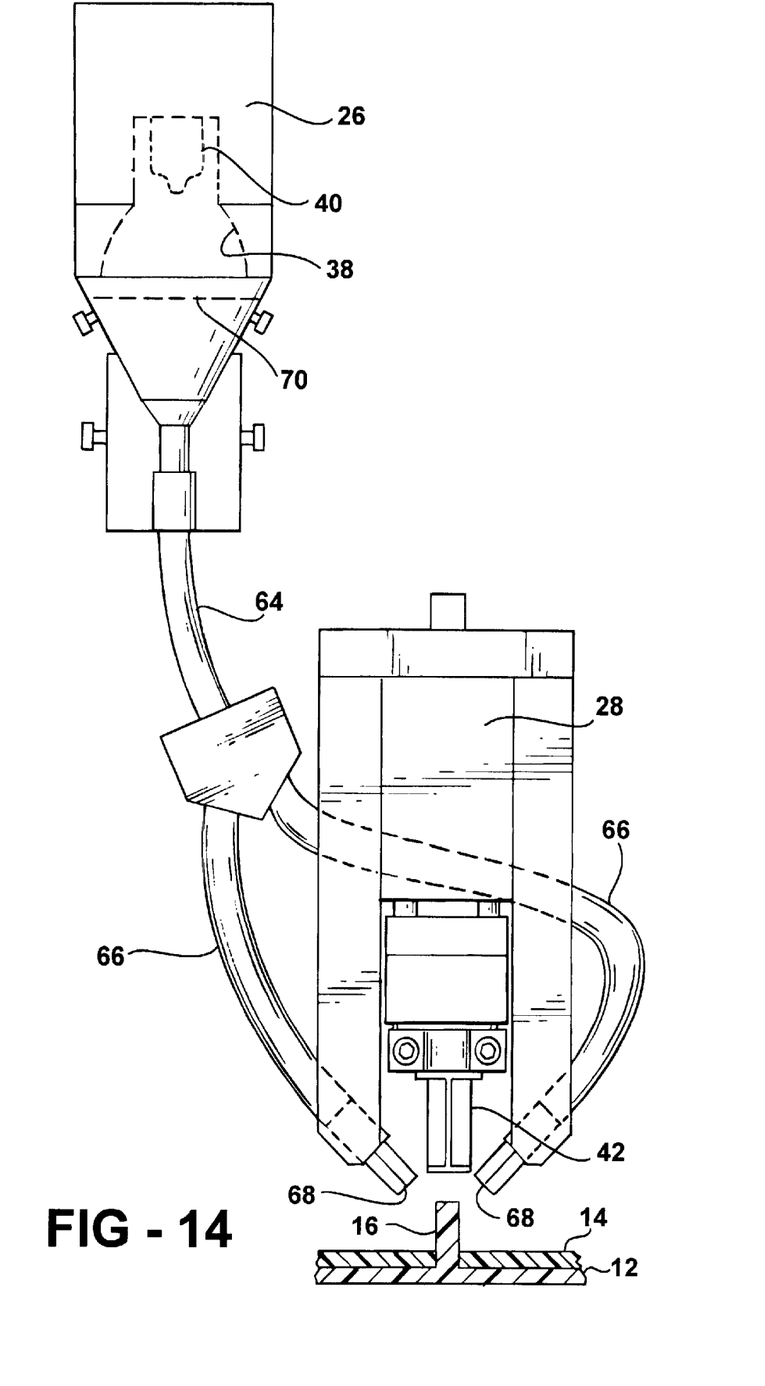
FIG. 14 is a schematic view of a heat staking apparatus using fiber optic cables to focus the energy.

In an another alternative embodiment of the invention shown in FIG. 14, an air cylinder 28 drives a selectively adjustable carriage 42 toward and away from stud 16 in a manner generally similar to the first embodiment disclosed hereinabove. In this embodiment, the energy source, such as an infrared lamp 40, is mounted in a housing 26, and adjacent to the adjustable carriage 42. The movement of the adjustable carriage 42 being selectively driven by the air cylinder 28. The energy from the lamp 40 is directed toward a convergent lens 70 by a reflector 38. The energy is then focused by the convergent lens 70 into a fiber optic cable 64. The fiber optic cable 64 extends from the lens 70 and splits into a plurality of sub-cables 66 which have distal ends 68. The distal ends 68 are arrayed around and directed at a region into which the stud 16 is positioned. Preferably, the distal ends 68 are arrayed evenly around the region that encompasses the circumference of the stud 16. The energy travels along the cable 64 and is split among a plurality of sub-cables 66, and exits the sub-cable ends 68. Fiber optic cables are thin glass or plastic filaments which conduct light by internal refraction, and are well know in the art.

The use of a heat lamp in a staking machine according to the present invention provides a heat source with nearly instant on/off control, thereby providing precise temperature control. The radiant heat source heats only the stud, thus achieving an overall efficiency of approximately 80%. Commercially available infrared lamps are relatively inexpensive and have lives on the order of 2000 hours, contributing further to the economic advantage of the invention over the prior art. The use of commercially available 100 watt lamps provide sufficient energy for most plastics, but when greater energy is needed larger wattage lamps can be used.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A heat staking apparatus for deforming a thermoplastic part comprising:
    a housing defining a treatment area into which at least a portion of the part to be deformed is admitted;
    an energy source disposed in the housing for generating energy in the infrared band;
    energy directing means for directing energy from the source to the treatment area;
    a punch mounted in the housing for movement relative to the energy source and relative to the directing means, the punch being used for impacting the portion of the thermoplastic port to be deformed; and
    power means for selectively causing movement of the punch.

2. The apparatus as defined in claim 1 wherein the energy source is an incandescent lamp.

3. The apparatus defined in claim 1 wherein the energy directing means comprises at least one reflector.

4. The apparatus as defined in claim 3 wherein the reflector has a reflective surface covered by a layer of gold.

5. A heat staking apparatus for deforming a thermoplastic part comprising:
    a housing defining a treatment area into which at least a portion of the part to be deformed is admitted;
    energy source disposed in the housing for generating energy in the infrared band, wherein the infrared energy source further comprises an incandescent lamp;
    an energy directing means for directing energy from the source to the treatment area, wherein the energy directing means further includes a primary reflector surrounding the lamp and a secondary reflector spaced from the primary reflector and surrounding the treatment area;
    a punch mounted in the housing for movement relative to the source toward and away from the treatment area; and
    power means for selectively causing movement of the punch.

6. A heat staking apparatus for deforming a thermoplastic part comprising:
    a housing defining a treatment area into which at least a portion of the part to be deformed is admitted;
    an energy source disposed in the housing for generating energy in the infrared band;
    an energy directing means for directing energy from the source to the treatment area, wherein the energy directing means comprises at least one reflector;
    a punch mounted in the housing for movement relative to the source toward and away from the treatment area;
    a power means for selectively causing movement of the punch; and
    secondary reflector having a plurality of connected curved sections for providing localized redirection of the infrared energy and wherein each curved section directs the infrared energy to a different focal area.

7. The apparatus as defined in claim 1 wherein the energy directing means comprises fiber optic cables.

8. A heat staking apparatus for deforming a thermoplastic part comprising:
    a housing defining a treatment area into which at least a portion of the part to be deformed is admitted;
    an energy source disposed in the housing for generating energy in the infrared band, the energy source comprises a plurality of incandescent lamps;
    a punch mounted in the housing for movement relative to the source toward and away from the treatment area; and
    a power means for selectively causing movement of the punch.

9. The apparatus as defined in claim 2 wherein the incandescent lamp is a halogen lamp.

10. The apparatus as defined in claim 1 wherein the housing includes a slidable carriage moveable along an axis toward the thermoplastic part and wherein the punch is mounted on the slidable carriage.

11. The apparatus as defined in claim 10 wherein the slidable carriage is magnetically attached to the power means for selectively moving the punch.

12. The apparatus as defined in claim 11 wherein the power means is a pneumatic cylinder.

13. A heat staking apparatus for deforming a thermoplastic part comprising:
    a housing defining a treatment area into which at least a portion of the part to be deformed is admitted, the housing including an arm rotatably connected to the housing;

an energy source disposed in the housing for generating energy in the infrared band;

energy directing means for directing energy from the source to the treatment area;

a punch mounted on the arm; and power means for selectively causing movement of the punch.

14. The apparatus as defined in claim 13 wherein motion of the rotatable arm is selectively controlled by a pneumatic cylinder.

15. A heat staking apparatus for deforming a thermoplastic part comprising:

a cylindrical housing having an end cap defining a cavity into which at least a portion of the stud can be admitted;

an energy source disposed in the housing and for generating energy in the infrared band;

a primary reflector disposed in and fixed to the housing in surrounding relationship to the energy source for directing energy substantially axially of the housing;

a secondary reflector affixed to the housing in axially spaced relation with the primary reflector to receive energy therefrom and to concentrate the energy on a defined treatment area essentially surrounded by the secondary reflector; said secondary reflector having an aperture found centrally therein to admit the stud into the treatment area;

a punch mounted in the housing for movement relative to the energy source and relative to the primary reflector, the punch being used for impacting the portion of the thermoplastic part to be deformed; and a power means for selectively causing movement of the punch.

16. The apparatus as defined in claim 15 wherein the secondary reflector comprising a plurality of connected curved sections for providing localized redirection of the infrared energy and wherein each curved section directs the infrared energy to a focal area at a different distance from the central aperture.

17. The apparatus as defined in claim 16 wherein the primary reflector and the secondary reflector are covered with a thin layer of gold.

18. The apparatus as defined in claim 15 wherein the punch is magnetically attached to the power means, and is slidably moveable along an axis toward the treatment area.

19. A heat staking apparatus for deforming a thermoplastic part comprising:

a housing defining a cavity into which at least a portion of the part is admitted;

an energy source including at least one incandescent lamp for generating energy in the infrared band and affixed to the housing;

a primary reflector having a generally parabolic shape surrounding the lamp and directing the light toward a secondary reflector;

the secondary reflector spaced from the primary reflector and including a central aperture and a plurality of connected curved sections wherein each curved section provides localized redirection of the light to a focal area at a different distance from the central aperture;

a slidable carriage mounted on the housing and moveable along an axis toward and away from the part;

a power means magnetically attached to the slidable carriage and for selectively moving the slidable carriage toward and away from the part; and a punch mounted on the carriage.

20. A heat staking apparatus for deforming a thermoplastic part comprising:

an energy source disposed in a housing for generating energy in an infrared band;

energy directing means for directing energy from the source to a treatment area; and a punch mounted in a housing for movement relative to the energy source and relative to the energy directing means to operably engage a portion of a thermoplastic part to be deformed.

21. The heat staking apparatus of claim 20 further comprising:

the housing defining a treatment area into which at least a portion of the part to be deformed is admitted.

22. The heat staking apparatus of claim 20 further comprising:

power means for selectively causing movement of the punch.

* * * * *